US010059175B2

(12) United States Patent
Cuddihy et al.

(10) Patent No.: US 10,059,175 B2
(45) Date of Patent: Aug. 28, 2018

(54) AUTONOMOUS VEHICLE WITH AUTOMATIC WINDOW SHADE

(71) Applicant: Ford Global Technologies, LLC, Dearborn, MI (US)

(72) Inventors: Mark A. Cuddihy, New Boston, MI (US); Thomas Edward Pilutti, Ann Arbor, MI (US); Manoharprasad K. Rao, Novi, MI (US); Andrew Waldis, Orion Township, MI (US); Roger Arnold Trombley, Ann Arbor, MI (US); Matthew Y. Rupp, Canton, MI (US); Wilford Trent Yopp, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 739 days.

(21) Appl. No.: 14/208,203

(22) Filed: Mar. 13, 2014

(65) Prior Publication Data

US 2015/0261219 A1  Sep. 17, 2015

(51) Int. Cl.
*B60J 3/04* (2006.01)
*B60J 1/20* (2006.01)

(52) U.S. Cl.
CPC .............. *B60J 3/04* (2013.01); *B60J 1/2016* (2013.01)

(58) Field of Classification Search
USPC ........................................................ 701/23
See application file for complete search history.

(56) References Cited

U.S. PATENT DOCUMENTS

| | | | |
|---|---|---|---|
| 5,663,621 A * | 9/1997 | Popat | G05D 25/02 160/166.1 |
| 6,759,643 B2 | 7/2004 | Su et al. | |
| 7,568,751 B2 | 8/2009 | Suzuki et al. | |
| 8,102,586 B2 | 1/2012 | Albahri | |
| 8,890,456 B2 * | 11/2014 | Berman | H04L 12/2827 318/286 |
| 2014/0097636 A1 * | 4/2014 | Snider | B60J 1/001 296/97.8 |
| 2014/0168608 A1 * | 6/2014 | Disley | G03B 29/00 352/132 |
| 2015/0224856 A1 * | 8/2015 | Snider | B60J 7/0015 296/152 |

FOREIGN PATENT DOCUMENTS

| | | |
|---|---|---|
| CN | 201895556 U | 7/2011 |
| JP | 2005186909 A * | 7/2005 |

OTHER PUBLICATIONS

Tellez et al—Automated Car Sun Shade System—Fall 2005—Senior Project Final Presentation.

\* cited by examiner

*Primary Examiner* — Shelley Chen
(74) *Attorney, Agent, or Firm* — Frank A. MacKenzie; Bejin Bieneman PLC

(57) ABSTRACT

A vehicle includes at least one autonomous driving sensor and an autonomous mode controller configured to receive signals generated by the autonomous driving sensor. The autonomous mode controller controls at least one vehicle subsystem based at least in part on the signals received. Furthermore, the autonomous mode controller is configured to shade at least one vehicle window when the vehicle is operating in an autonomous mode.

18 Claims, 3 Drawing Sheets

AUTONOMOUS VEHICLE WITH AUTOMATIC WINDOW SHADE

BACKGROUND

Vehicles operating in an autonomous (e.g., driverless) mode can relieve occupants, especially the driver, from some driving-related responsibilities. When operating in an autonomous mode, the vehicle can navigate to various locations using on-board sensors, allowing the vehicle to travel with minimal human interaction or in some cases without any passengers. Therefore, autonomous vehicles give passengers, especially the person who would otherwise be driving the vehicle, the opportunity to do other things while travelling. Instead of concentrating on numerous driving-related responsibilities, the driver may be free to watch movies or other media content, converse with other passengers, read, etc., while riding in an autonomous vehicle.

DETAILED DESCRIPTION

A vehicle includes at least one autonomous driving sensor and an autonomous mode controller configured to receive signals generated by the autonomous driving sensor. The autonomous mode controller controls at least one vehicle subsystem based at least in part on the signals received. Furthermore, the autonomous mode controller is configured to shade at least one vehicle window when the vehicle is operating in an autonomous mode. One way to shade the windows is by lowering a shade over one or more of the windows. Alternatively, the windows may be selectively tinted by, e.g., applying a current to the window tint.

The vehicle and components shown in the FIGS. may take many different forms and include multiple and/or alternate components and facilities. The exemplary vehicle and components illustrated are not intended to be limiting. Indeed, additional or alternative components and/or implementations may be used.

Figure 1:
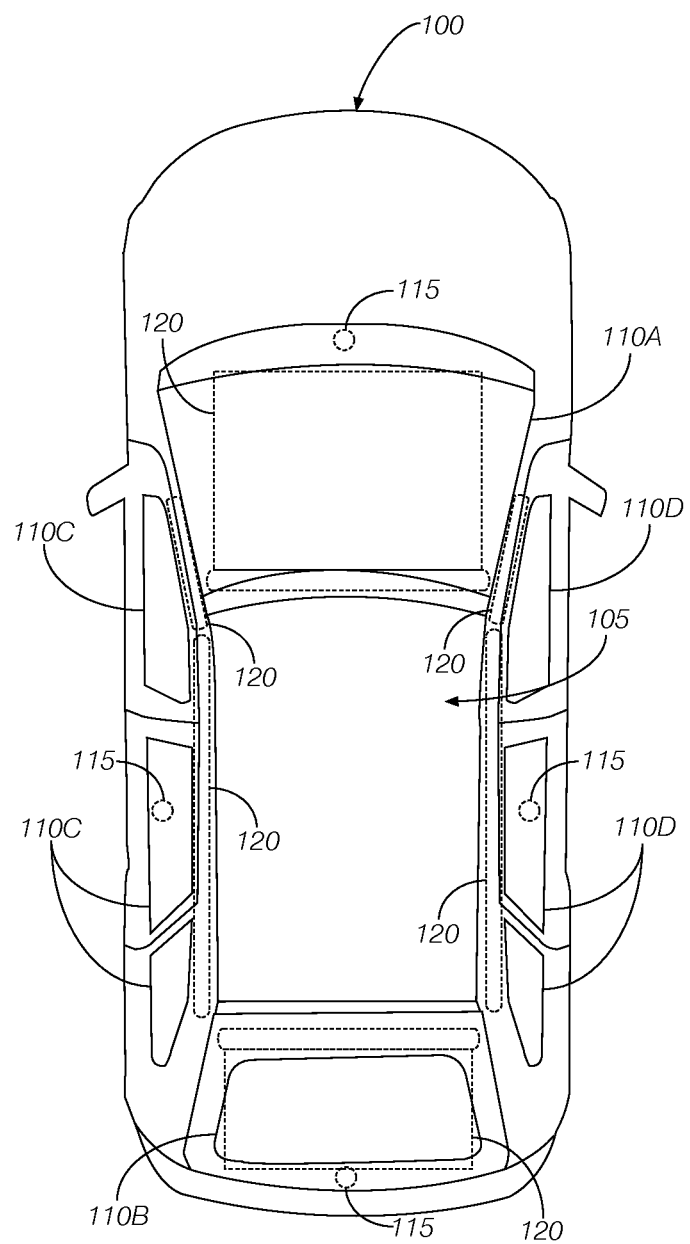
FIG. 1 illustrates an exemplary vehicle having an automatic window shades.

As illustrated in FIG. 1, the vehicle 100 includes a passenger compartment 105, windows 110, one or more light sensors 115, and shades 120. Although illustrated as a sedan, the vehicle 100 may include any passenger or commercial vehicle such as a car, a truck, a sport utility vehicle, a taxi, a bus, etc.

The passenger compartment 105 may include any part of the vehicle 100 where passengers may sit while the vehicle 100 is operating. In addition, the passenger compartment 105 may include seats and controls that allow a driver to control operation of the vehicle 100. Examples of controls may include a steering wheel, an accelerator pedal, a brake pedal, etc. The passenger compartment 105 may be accessed by opening one or more doors. Two doors may be located on the driver-side of the vehicle 100 and two other doors may be located on the passenger-side of the vehicle 100.

The windows 110 may allow light to enter the passenger compartment 105 of the vehicle 100. The windows 110 may be located about the vehicle 100. In some instances, the windows 110 may be incorporated into the doors. The window 110 at the front of the vehicle 100 may be referred to as the windshield 110A. The window 110 at the rear of the vehicle 100 may be referred to as the rear window 110B. The windows 110 on the driver-side of the vehicle 100 may be referred to as driver-side windows 110C, and the windows 110 on the passenger-side of the vehicle 100 may be referred to as passenger-side windows 110D.

Each light sensor 115 may be configured to measure an amount of ambient light and generate a signal representing the amount of ambient light measured. The ambient light may be measured in accordance with a sun load. The sun load may be defined as the amount of sunlight or other ambient light source received by the light sensor 115. Multiple light sensors 115 may be disposed about the vehicle 100. Each light sensor 115 may be associated with one or more windows 110, and the signal generated by each light sensor 115 may represent the sun load on the respective window 110.

The shades 120 may be configured to at least partially prevent sunlight or another source of ambient light from entering the passenger compartment 105 through one or more windows 110. The shades 120, which may be located in the passenger compartment 105, may be lowered to block ambient light and raised to allow ambient light to pass through the window 110. While the shades 120 may be generally opaque, it may be possible for some ambient light to enter the window 110 when the shade 120 is lowered. Nevertheless, the amount of ambient light entering the passenger compartment 105 may be significantly reduced when the shade 120 is lowered. Multiple shades 120 may be disposed throughout the passenger compartment 105. In general, each shade 120 may be associated with one or more windows 110. As discussed in greater detail below, each shade 120 may be lowered and/or raised automatically, and the movement of the shade 120 may be in accordance with a motor 155 (see FIG. 2) operably connected to the shade 120. Each shade or a group of shades 120 may be individually controlled by a motor 155. Not all shades 120 may be controlled by the same motor 155. Thus, at least one shade 120 may be in a lowered position while at least one other shade 120 is in a raised position, and vice versa. For instance, as shown in FIG. 1, the shades 120 associated with the windshield 110A and the rear window 110B are lowered while the shades associated with the driver-side windows 110C and the passenger-side windows 110D are raised.

In another possible approach, one or more of the windows 110 may be shaded by selectively tinting the window 110. Selectively tinting the windows may include, e.g., applying a current to a film disposed on the window 110. In some implementations, the film may be incorporated into the window glass. The opaqueness of the tint may be related to the amount of current applied to the window 110. Thus, the opaqueness may also be selectively controlled.

Figure 2:
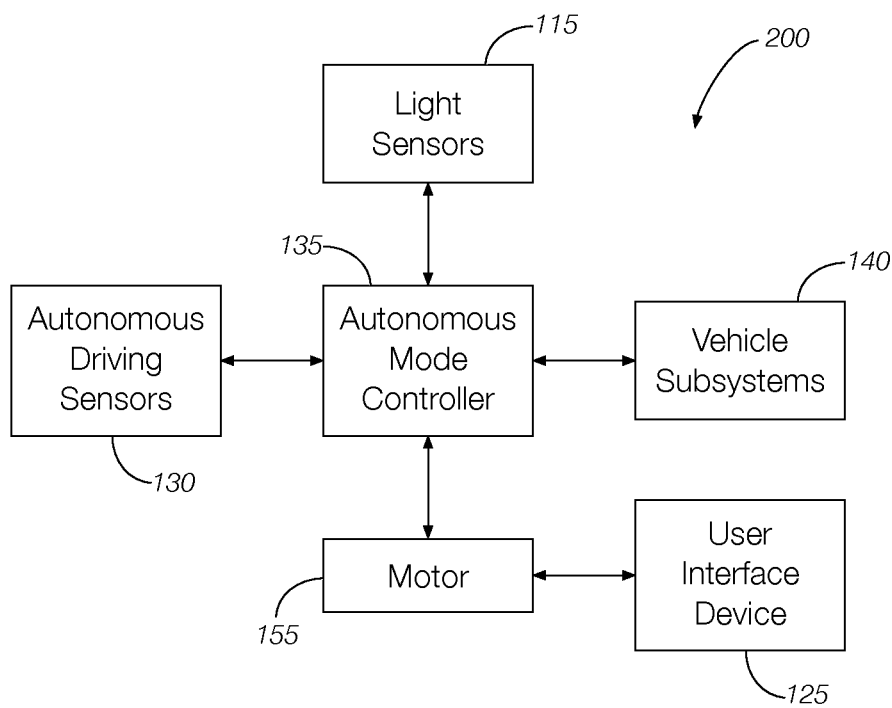
FIG. 2 is a block diagram of an exemplary vehicle system that may be implemented in the vehicle of FIG. 1.

FIG. 2 is a block diagram of an exemplary system 200 that may be implemented in the vehicle 100 of FIG. 1. As shown, the system includes a user interface device 125, at least one autonomous driving sensor 130, an autonomous mode controller 135, and vehicle subsystems 140.

Figure 3:
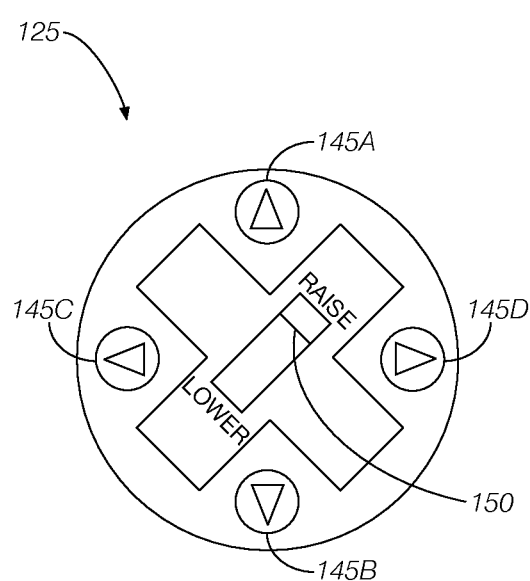
FIG. 3 is an exemplary user interface device that may be included in the vehicle of FIG. 1.

The user interface device 125 may be configured to present information to and/or receive inputs from a user, such as a driver or passenger, during operation of the vehicle 100. Thus, the user interface device 125 may be located in the passenger compartment 105 of the vehicle 100. In some possible approaches, the user interface device 125 may include a touch-sensitive display screen, or as shown in FIG. 3, mechanical buttons.

The autonomous driving sensors 130 may include any number of devices configured to generate signals that help navigate the vehicle 100 while the vehicle 100 is operating in an autonomous (e.g., driverless) mode. Examples of autonomous driving sensors 130 may include a radar sensor, a lidar sensor, a camera, or the like. The autonomous driving sensors 130 help the vehicle 100 "see" the roadway and/or negotiate various obstacles while the vehicle 100 is operating in the autonomous mode.

The autonomous mode controller 135 may be configured to control one or more subsystems 140 while the vehicle 100 is operating in the autonomous mode. Examples of subsystems 140 that may be controlled by the autonomous mode controller 135 may include a brake subsystem, a suspension subsystem, a steering subsystem, and a powertrain subsystem. The autonomous mode controller 135 may control any one or more of these subsystems 140 by outputting signals to control units associated with these subsystems 140. The autonomous mode controller 135 may control the subsystems 140 based, at least in part, on signals generated by the autonomous driving sensors 130.

The autonomous mode controller 135 may be configured to control the selective lowering and/or raising of one or more of the shades 120. One way to actuate the shades 120 may be for the autonomous mode controller 135 to provide command signals to the motor 155 associated with each shade 120. The autonomous mode controller 135 may be configured to lower the shades 120 when the vehicle 100 is operating in the autonomous mode and raise the shades 120 prior to the vehicle 100 operating in the non-autonomous mode. The autonomous mode controller 135 may be further configured to lower and/or raise the shades 120 in accordance with the signals received from the light sensors 115. Thus, while the vehicle 100 is operating in the autonomous mode, the autonomous mode controller 135 may be configured to lower the shades 120 on the side or sides of the vehicle 100 where the amount of ambient light exceeds a predetermined threshold. For instance, in the morning, the side of the vehicle 100 facing east may experience more ambient light than the side of the vehicle 100 facing west. Thus, the autonomous mode controller 135 may lower the shades 120 on the east side of the vehicle 100 while keeping the shades 120 on the west side of the vehicle 100 raised. As the vehicle 100 changes direction, the autonomous mode controller 135 may change which shades 120 are lowered and which are raised. Accordingly, the autonomous mode controller 135 may control the shades 120 to cover any combination of the windshield 110A, the rear window 110B, one or more driver-side windows 110C, and one or more passenger-side windows 110D.

The autonomous mode controller 135 may be further configured to control the operation of one or more shades 120 in accordance with the user input provided to the user interface device. Based on the user input, the autonomous mode controller 135 may raise or lower one or more shades 120 when the vehicle 100 is operating in the autonomous mode. The autonomous mode controller 135 may give the user input a higher priority than the signals received from the light sensors 115. That is, the autonomous mode controller 135 may control the shades 120 according to the user input even if the user input commands a different shade 120 position (i.e., raised or lowered) than suggested by the signals generated by the light sensors 115. The user may be provided with the option to deactivate and activate the automatic sunshade feature while the vehicle 100 is in the automatic drive operating mode with the user interface device 125. The lowering and raising of the shades 120 using the user interface device 125 may be allowed while the vehicle 100 is being driven in the automatic driving mode and in the driver-operated mode.

In general, computing systems and/or devices, such as the autonomous mode controller 135 and user interface device 125 may employ any of a number of computer operating systems, including, but by no means limited to, versions and/or varieties of the Ford Sync® operating system, the Microsoft Windows 110® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, an on-board vehicle 100 computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

FIG. 3 is an exemplary user interface device 125 that may be used to receive user inputs associated with the manual control of the shades 120 for when the vehicle 100 is operating in the autonomous or driver-operated mode. The user interface device 125 may, as discussed above, include a touch-screen display. Alternatively, as shown in FIG. 3, the user interface device 125 may include shade select buttons 145 and a shade operation switch 150. The shade select buttons 145 may allow the user to select a shade 120. Accordingly, each shade select button 145 may be associated with at least one shade 120 located in the vehicle 100. By way of example only, a first shade select button 145A may control the shade 120 that covers the windshield 110A, a second shade select button 145B may control the shade 120 that covers the rear window 110B, a third shade select button 145C may control one or more shades 120 that cover the driver-side windows 110C, and a fourth shade select button 145D may control one or more shades 120 that cover the passenger-side windows 110D. The shade operation switch 150 may apply a desired operation to the shade 120 selected via the shade select button 145. The operations may include lowering the shade 120 and raising the shade 120. The user may provide the user input by selecting a desired operation via the shade operation select switch 150 and selecting a shade 120 via the shade select button 145. Pressing the shade select button 145 will apply the selected operation for the shade 120 associated shade select button 145. The user interface device 125 may generate a command signal representing the user input, and the command signal may be output to the autonomous mode controller 135 or directly to the motor 155. The motor 155 may actuate the shades 120 according to the user input, even if the user input contradicts the position of one or more shades 120 as determined by the autonomous mode controller 135 based on the signals from the light sensors 115.

Figure 4:
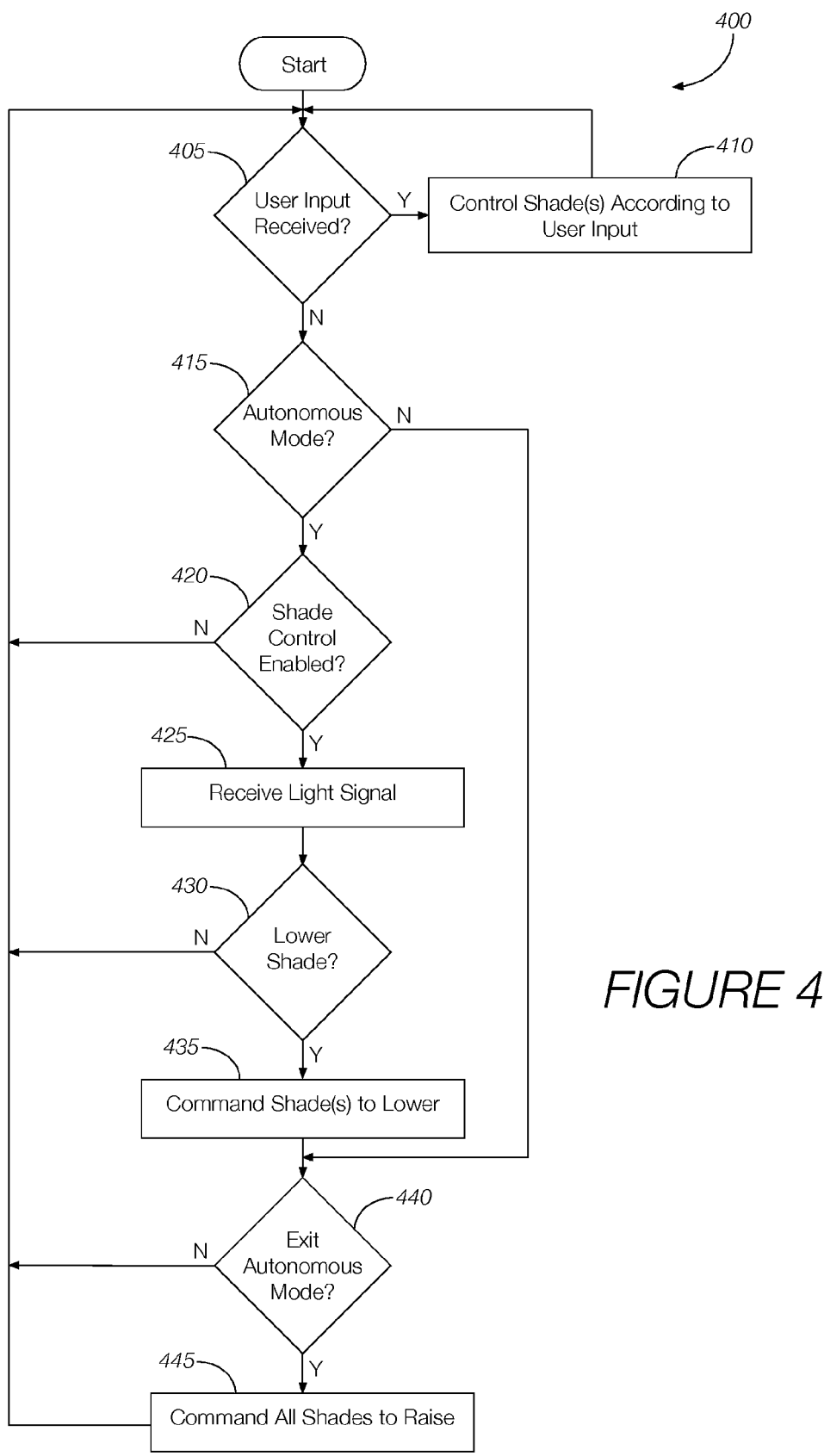
FIG. 4 is a flowchart of an exemplary process that may be used to control the operation of the shades in the vehicle of FIG. 1.

FIG. 4 is a flowchart of an exemplary process 400 that may be implemented by, e.g., the autonomous mode controller 135 to control the operation of the shades 120 in the vehicle 100.

At decision block 405, the autonomous mode controller 135 may determine whether a user input commanding one or more of the shades 120 to raise or lower was received. The user input may be received via, e.g., the user interface device 125. If the user input was received, the process 400 may continue at block 410. If no user input was received, the process 400 may continue at block 415. Accordingly, the user input may take precedence over the decisions of the autonomous mode controller 135 relative to the position of the shades 120 based on, e.g., ambient light conditions.

At block 410, the user interface device 125 may command one or more shades 120 to move to the position indicated by the user input. The user input may specify that one or more shades 120 be raised or lowered, and the user interface device 125 may output signals to the motor 155 to control the raising and/or lowering of one or more shades 120. In some instances, the autonomous mode controller 135 may ignore the user input if, e.g., the vehicle 100 is operating in the non-autonomous mode and lowering one or more shades 120 may be dangerous (e.g., the lowered shade would obstruct the driver's view).

At decision block 415, the autonomous mode controller 135 may determine whether the vehicle 100 is operating in the autonomous mode. If so, the process 400 may continue at block 420. If not, the process 400 may proceed to block 440. This way, the shades 120 may only be automatically lowered if the vehicle 100 is operating in the autonomous mode.

At decision block 420, the autonomous mode controller 135 may determine whether the system for automatically controlling the shades 120 during autonomous operation of the vehicle 100 has been enabled. For instance, the autonomous mode controller 135 may determine whether a user input has been received that instructs the autonomous mode controller 135 to keep the shades 120 raised, even when the vehicle 100 is operating in the autonomous mode. If the feature is enabled, the process 400 may continue at block 425. If the feature has not been enabled, the process 400 may continue at block 405.

At block 425, the autonomous mode controller 135 may receive one or more light signals generated by the light sensors 115. The light signals may represent the amount of ambient light outside the vehicle 100, and specifically, the amount of ambient light that would come through the windows 110 if the shades 120 were raised. The light signals may each represent differing amounts of ambient light since different sides of the vehicle 100 may be exposed to different light levels.

At decision block 430, the autonomous mode controller 135 may determine which shades 120, if any, to lower or raise. For instance, the autonomous mode controller 135 may compare the amounts of ambient light received from each light sensor 115 to a threshold. If the amount of ambient light changes with respect to the threshold, the process 400 may continue at block 435. Otherwise, the process 400 may return to block 405.

At block 435, the autonomous mode controller 135 may command one or more shades 120 to lower and/or raise by outputting command signals to the motor 155 associated with one or more of the shades 120. In some instances, the autonomous mode controller 135 may command all of the shades 120 to lower and/or raise. Alternatively, the autonomous mode controller 135 may command only shades 120 associated with the light sensors 115 that detected an amount of ambient light exceeding the threshold to lower while all other shades 120 are raised.

At decision block 440, the autonomous mode controller 135 may determine whether the vehicle 100 needs to switch to a non-autonomous mode of operation, switch to any other mode that requires the driver to be able to see out one or more of the windows 110, or otherwise exit the autonomous operation of the vehicle 100. If so, the process 400 may continue at block 445. If the vehicle 100 is to remain in the autonomous mode of operation, the process 400 may continue at block 405 so that the orientation of the shades 120 may subsequently change in response to a subsequent user input, or, e.g., the amount of ambient light changes as detected by any one or more of the light sensors 115.

At block 445, the autonomous mode controller 135 may raise all shades 120 to prepare for operating in the non-autonomous mode. In some possible implementations, the autonomous mode controller 135 may confirm that all shades 120 have been raised prior to allowing the vehicle 100 to operate in the non-autonomous mode. Raising the shades 120 may include commanding the motors 115 associated with any lowered shades 120 to cause the shades to raise. The process 400 may end or return to block 405 after block 445 is executed.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle system comprising:
at least one autonomous driving sensor;
an autonomous mode controller configured to receive signals generated by the autonomous driving sensor and control at least one vehicle subsystem based at least in part on the signals received;
wherein the autonomous mode controller is programmed to selectively shade at least one vehicle window when the vehicle is operating in an autonomous mode and in accordance with an ambient light signal;
a light sensor programmed to output the ambient light signal representing an amount of ambient light outside a vehicle,
wherein the autonomous mode controller is programmed to:
compare the amount of ambient light to a predetermined threshold,
determine a direction of the ambient light, and
select at least one vehicle window to shade based at least in part on the direction of the ambient light and the amount of ambient light exceeding the predetermined threshold.

2. The vehicle system of claim 1, wherein the autonomous mode controller is configured to at least one of lower and raise a shade when the vehicle is operating in the autonomous mode and raise the shade prior to operating in a non-autonomous mode.

3. The vehicle system of claim 1, wherein shading the at least one vehicle window includes covering at least one of a vehicle windshield and a rear window with a shade.

4. The vehicle system of claim 1, wherein shading the at least one vehicle window includes covering at least one of a driver-side window and a passenger-side window.

5. The vehicle system of claim 1, wherein shading the at least one vehicle window includes selectively tinting the at least one vehicle window.

6. The vehicle system of claim 1, further comprising a user interface device configured to receive a user input, and wherein the shading of the at least one vehicle window is controlled in accordance with the user input and wherein the autonomous mode controller is programmed to give priority to the user input over the ambient light signal.

7. A vehicle system comprising:
an autonomous mode controller programmed to control at least one vehicle subsystem while operating in an autonomous mode and programmed to receive an ambient light signal output by a light sensor, the ambient light signal representing an amount of ambient light outside a vehicle and a direction of the ambient light relative to the vehicle;
wherein the autonomous mode controller is programmed to selectively shade at least one window when the vehicle is operating in an autonomous mode based at least in part on the ambient light signal by:
comparing the amount of ambient light to a predetermined threshold,
determining the direction of the ambient light, and
selecting at least one window to shade based at least in part on the direction of the ambient light and the amount of ambient light exceeding the predetermined threshold.

8. The vehicle system of claim 7, wherein the autonomous mode controller is configured to at least one of lower and raise a shade when the vehicle is operating in the autonomous mode and raise the shade prior to operating in a non-autonomous mode.

9. The vehicle system of claim 7, wherein selectively shading the at least one window includes covering at least one of a vehicle windshield and a rear window.

10. The vehicle system of claim 7, wherein selectively shading the at least one window includes covering at least one of a driver-side window and a passenger-side window.

11. The vehicle system of claim 7, wherein selectively shading the at least one window includes selectively tinting the at least one window.

12. The vehicle system of claim 7, further comprising a user interface device configured to receive a user input, and wherein shading the at least one window is controlled in accordance with the user input, and wherein the autonomous mode controller is programmed to give priority to the user input over the ambient light signal.

13. A method comprising:
determining whether a vehicle is operating in an autonomous mode;

receiving an ambient light signal representing an amount of ambient light outside the vehicle;

comparing the amount of ambient light to a predetermined threshold; and selectively shading a vehicle window based on determining that the vehicle is operating in the autonomous mode and the amount of ambient light outside the vehicle exceeding the predetermined threshold, wherein selectively shading the vehicle window includes determining the direction of the ambient light and selecting at least one window to shade based at least in part on the direction of the ambient light and the amount of ambient light exceeding the predetermined threshold.

14. The method of claim 13, further comprising unshading the window based on at least one of whether the vehicle is operating in the autonomous mode and the amount of ambient light outside the vehicle.

15. The method of claim 13, wherein selectively shading the vehicle window includes lowering a shade when the vehicle is operating in the autonomous mode; and the method further comprising raising the shade prior to the vehicle operating in a non-autonomous mode.

16. The method of claim 15, wherein the shade is configured to cover at least one of a vehicle windshield, at least one driver-side window, at least one passenger-side window, and a rear window.

17. The method of claim 13, further comprising:

receiving a user input;

wherein selectively shading the window is based at least in part on the user input received despite the amount of ambient light outside the vehicle represented by the ambient light signal.

18. The method of claim 13, wherein selectively shading the at least one window includes selectively tinting the at least one window.

* * * * *